(No Model.)

J., S. & D. BARROW.
STUMP EXTRACTOR.

No. 247,291. Patented Sept. 20, 1881.

WITNESSES:
C. Neveux
C. Sedgwick

INVENTOR:
J. Barrow
S. Barrow
D. Barrow
BY
Munn & Co
ATTORNEYS.

UNITED STATES PATENT OFFICE.

JACOB BARROW, SAMUEL BARROW, AND DAVID BARROW, OF WINDFALL, INDIANA.

STUMP-EXTRACTOR.

SPECIFICATION forming part of Letters Patent No. 247,291, dated September 20, 1881.

Application filed May 23, 1881. (No model.)

*To all whom it may concern:*

Be it known that we, JACOB BARROW, SAMUEL BARROW, and DAVID BARROW, residents of Windfall, county of Tipton, and State of Indiana, have invented certain useful Improvements in Stump-Extractors, of which the following is a specification.

Our invention consists in a portable apparatus combining two jacks and a beam, whereby double power can be applied to raise the beam and either end raised, or both at once.

The invention consists, further, in the peculiar construction of the lifting-bars, holding-dogs, levers, and other parts, as hereinafter described and claimed with reference to the drawings.

Figure 1:
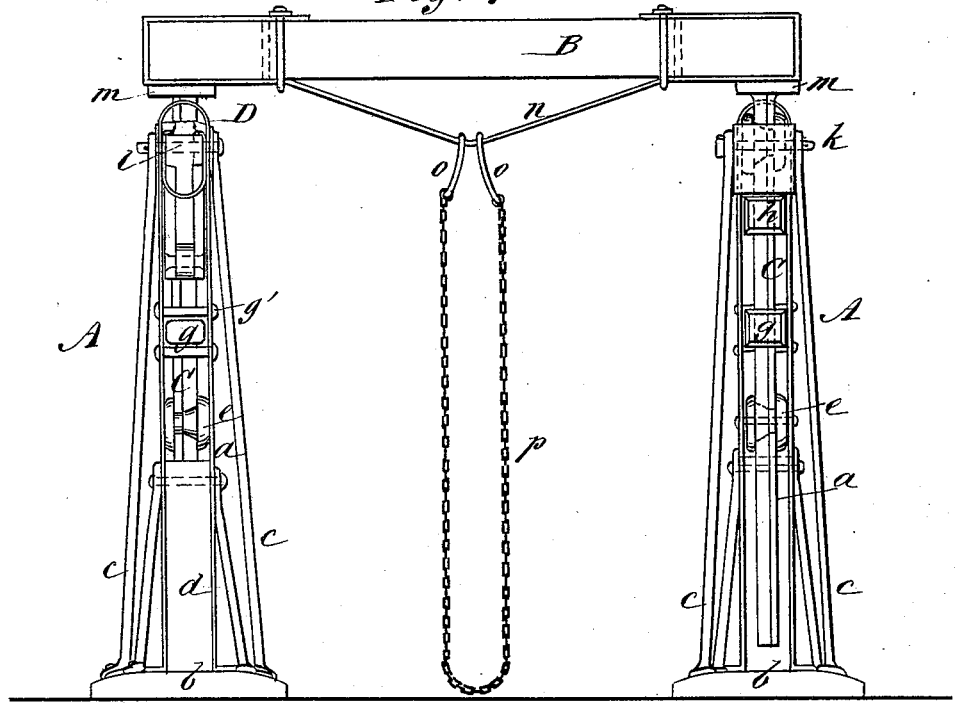
Figure 2:
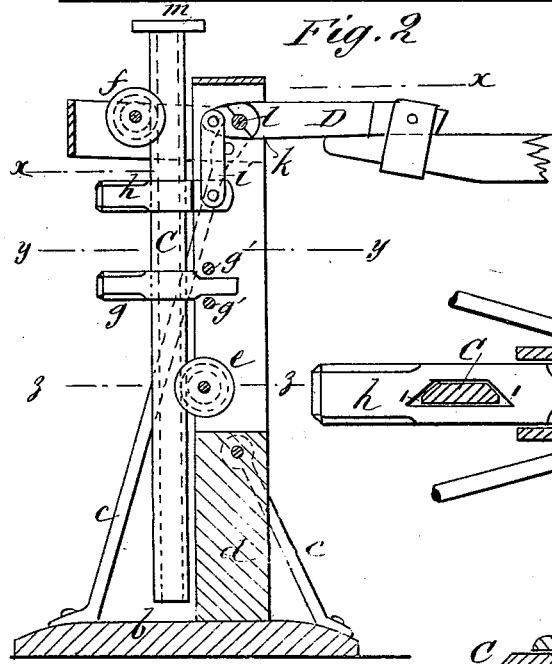
Figure 4:
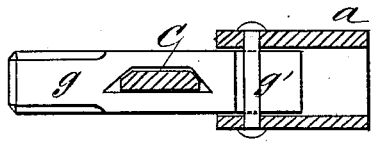
Figure 3:
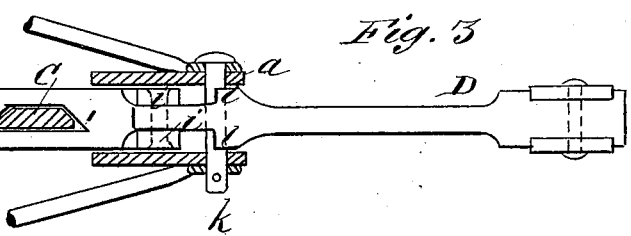
Figure 5:
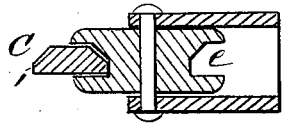

In the drawings, Figure 1 is a side elevation of the apparatus complete. Fig. 2 is a sectional side elevation of one jack at right angles to the position shown in Fig. 1. Fig. 3 is a horizontal section on line $x\,x$ of Fig. 2. Figs. 4 and 5 are horizontal sections on the lines $y\,y$ and $z\,z$, respectively.

Similar letters of reference indicate corresponding parts.

A A are the jacks, provided with lifting-bars C, on which the beam B rests. The jacks are similar in construction, and the following description applies to either.

$a$ is the standard, bolted firmly to a base-piece, $b$, and stiffened by braces $c\,c$. The standard is formed of side plates of metal fitted with a block, $d$, at the lower end, so that the bottom portion is solid and the upper part open for receiving the rollers and other operative parts.

In the standard, just above block $d$, is a grooved roller, $e$, upon a cross-pin, and at the upper end, between side plates or flanges that extend from the standard, is a second grooved roller, $f$.

Immediately above the lower roller, $e$, is the clamping-dog $g$, which is sustained in the standard by cross-pins $g'\,g'$ above and below the dog, so that its outer end is free to swing up and down as far as required. Above dog $g$ is the lifting-dog $h$, hung by links $i$ from the operating-lever, hereinafter described.

Both dogs $g\,h$ are slotted for the lifting-bar C to pass through, such bar passing also between the two rollers $e\,f$. The bar C, as shown most clearly in Figs. 3, 4, and 5, is formed with its edges beveled, but the bevels are not brought to feather-edges. A plain edge or face, 1, is left of about one-third of the width of the bar at each side.

The apertures of the dogs $g\,h$ are shaped to receive the bar snugly, and the beveled sides are extended to an acute angle, so that there is a space at each side of the bar. This has the effect to insure a tight clamping action of the dog on the bar, and the gripe is not lessened by wear, as would be the case if the bar fitted the apertures at the angle.

The rollers $e\,f$ are grooved to fit the beveled edges of the lifting-bar, so that they prevent any lateral movement.

D is the lever, sustained betweeen the sides of standard $a$ by a fulcrum-pin, $k$. The lever is formed with half-bosses $l\,l$, resting on the fulcrum-pin and bearing against the side plates of the standard. These bosses serve to prevent side movement of the lever and give a broad bearing on the fulcrum-pin, so that the pin shall not be bent. When the lever is lowered and dog $h$ raised the links $i$ are allowed by the cut-away portion of the bosses to work closely to the fulcrum-pin, so that a better leverage can be obtained.

The lifting-bars C are fitted with cap-plates $m$, on which the beam B rests. The beam is solid, and fitted at the under side with a truss rod or plate, $n$, that is attached to the ends of the bar. On the rod $n$ are rings $o$, for the chain $p$, that is to be connected to the stump. The beam and rod thus form a truss of great strength, and the weight is taken on the ends of the beam above the lifting-bars C.

This stump-puller, being in three separate parts, can be readily moved from place to place and set up. The jacks can be placed with the levers extending in either direction, as required or most convenient.

By operating both levers the beam is lifted at both ends with double power; but either end may be raised singly to obtain a lever action of the beam or to position it for obtaining equal strain when both jacks are operated.

Having thus fully described our invention, we claim as new and desire to secure by Letters Patent—

1. The beam B, fitted with the truss rod or plate n, in combination with the two lifting-jacks A, substantially as shown and described.

2. In stump-extractors, the lifting-jacks consisting of standard a, grooved rollers e f, dogs g h, bar C, lever D, and links i, substantially as shown and described, combined for operation as set forth.

3. The lifting-bars C, formed with beveled edges and face 1, in combination with the lifting and holding dogs g h, having their beveled apertures extended beyond the ends of the bars, as shown and described.

4. The levers D, formed with half-bosses l, the fulcrum-pins k, and links i, substantially as shown and described, in combination with dog h and bar C, as set forth.

JACOB BARROW.
SAMUEL BARROW.
DAVID BARROW.

Witnesses:
N. J. MINER,
L. S. BARROW.